United States Patent [19]

Mineck

[11] Patent Number: 5,028,458
[45] Date of Patent: Jul. 2, 1991

[54] ANTISEPTIC POLISH

[75] Inventor: Fred Mineck, Apache Junction, Ariz.

[73] Assignee: Warren F. B. Lindsley, Phoenix, Ariz. ; a part interest

[21] Appl. No.: 466,019

[22] Filed: Jan. 16, 1990

[51] Int. Cl.$^5$ .......................... C09D 5/14; A61L 2/00
[52] U.S. Cl. ..................................... 427/355; 427/369; 427/385.5; 106/3; 106/6; 106/11; 106/15.05; 106/16; 422/1; 422/28; 422/37; 424/667; 424/668; 424/669; 424/672
[58] Field of Search ............... 427/11, 355, 369, 385.5; 106/3, 5, 6, 7, 8, 9, 10, 11, 15.05, 16, 17, 18; 422/1, 28, 37; 424/667, 668, 669, 670, 671, 672

[56] References Cited

U.S. PATENT DOCUMENTS

| | | | |
|---|---|---|---|
| 3,792,049 | 12/1974 | Varsanyi et al. | 106/3 |
| 3,911,107 | 10/1975 | Krezanoski | 422/37 |
| 3,992,335 | 11/1976 | Dennissenko et al. | 106/5 |
| 4,088,597 | 5/1978 | Morlock et al. | 424/670 |
| 4,374,126 | 2/1983 | Cardarelli et al. | 424/667 |
| 4,444,756 | 4/1984 | Schlussler et al. | 424/671 |
| 4,749,411 | 6/1988 | Chapin | 106/10 |
| 4,801,362 | 1/1989 | Fenyes | 106/3 |

FOREIGN PATENT DOCUMENTS 2444468  8/1980  France ................... 422/37

*Primary Examiner*—Shrive Beck
*Assistant Examiner*—Margaret Burke
*Attorney, Agent, or Firm*—Warren F. B. Lindsley

[57] ABSTRACT

There is disclosed an antiseptic polish for covering highly touched surfaces which contain a solution comprising Povidone-Iodine of approximately 7.5 to 10 percent by volume dispersed in a liquid polish.

4 Claims, 1 Drawing Sheet

ANTISEPTIC POLISH

BACKGROUND OF THE INVENTION

This invention relates to a substance which retards or prevents the growth and development of lower forms of organisms injurious to higher forms of life. More particularly this invention is directed to a polish containing an antiseptic which hardens when air dried on an object and maintains its disinfectant characteristics for days and even several months when the antiseptic polish is applied to a surface such as a door knob, toilet seat, shopping cart handle, etc.

DESCRIPTION OF THE PRIOR ART

The discovery that the breaking down or decay of organic bodies was caused by minute plants, fungi, bacteria, etc. led to the idea of preventing the action of these bodies by the employment of some antagonistic substance. In medicine it has been found that many of these bacteria produce a condition known as sepsis or poisoning and when carbolic spray was used to prevent the development of these bacteria the word "antiseptic" came to be applied to any substance that inhibits the growth or destroys bacterial agents of putrefaction.

The word "disinfectant" properly applies to a substance used for the destruction of a definite infecting agent, such as exists in phthisical sputum or in typhoid urine or stools but has also been used for a remedy that merely destroys a disagreeable odor. Most so-called disinfectants manufactured to place in closets or urinals are nothing but strong smelling deodorants. As disinfectants, most of the prior art "over the counter" substances are wholly useless.

Germicides, bactericides and septicides may be divided into two groups. In the former group is heat, i.e., the most important of all germicides and in the second group are chemical antiseptics especially used in the preservation of foods. Other uses of antiseptics involve the preservation of wood with creosote, the sterilizing of drinking water with sodium besulphate or chloride of lime and the sanitizing of swimming pools with sodium hypochlorite.

In modern surgery it is not the destruction of the bacteria that is attempted, but rather their prevention. Should the nature of a wound be such that it is already infected, the antiseptics are of service. The most valuable surgical antiseptics are the phenols and their derivatives (carbolic acids, salicylates, etc.), salts of mercury, silver, lead, aluminum, copper and zinc, preparation of chlorine, iodine, bromine, permanganate of potash, benzoic acid, organic alderhydes, formaldehyde, benzaldehyde, alcohol, thynol, menthol, eucalyptol and hydrogen peroxide.

None of these substances can be effectively applied to a door knob, toilet seat, shopping basket handle or any other often touched article and retain its antiseptic ability over an extended period of time such as, for example, an hour, day, week or month.

Thus a need exists for an antiseptic polish for application as a thin coating to the above defined articles which will harden and dry and remain antiseptic and disinfective.

SUMMARY OF THE INVENTION

It is, therefore, an object of this invention to provide a new and improved antiseptic polish.

Another object of this invention is to provide a new and improved substance which retards or prevents the growth and development of organisms in a polish form which hardens when air dried on an object and maintains its disinfectant characteristics for a given time.

A further object of this invention is to provide a new and improved antiseptic substance for application to a door knob, toilet seat, shopping basket or cart handle or any other often touched article which will retain its antiseptic ability over an extended period of time.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described with reference to the accompanying drawing, in which.

DESCRIPTION OF THE PREFERRED EMBODIMENT

Figure 1:
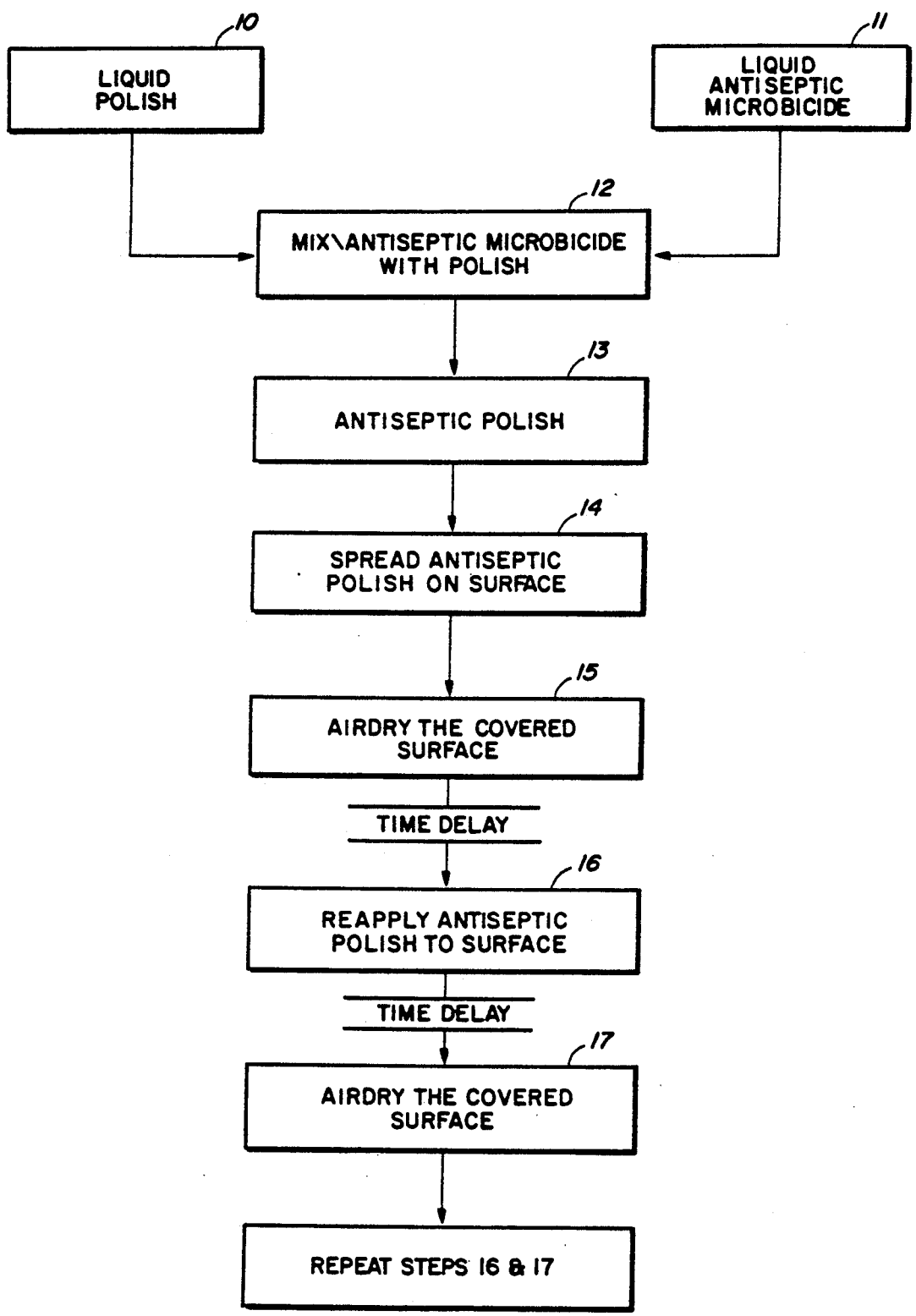
FIG. 1 is a block diagram illustrating the method of forming the product and its use.

Referring more particularly to the drawing by characters of reference, FIG. 1 discloses the method steps in the manufacture of a new polish substance containing an antiseptic and method of use.

As illustrated in the drawing, a suitable polish 10 is selected as a carrier for a suitable antiseptic 11 with the antiseptic being dispensed in the polish 10 by method step 12 to form the resulting antiseptic polish substance, liquid or product 13.

Polish 10 is a preparation such as a liquid or cream that is used to produce a gloss and often a color for the protection and decoration of a surface. One suitable form of a polish for use in this disclosure is Reed-Union Corporation's (Chicago, Ill.) car polish sold under their trademark NU FINISH. This product contains petroleum distillates which form a chemical compound or mixture of compounds which may be formed by a polymerization technique. This product contains no wax and when air dried provides a hard surface which will bead, shine and protect a surface covered with it for many washings.

The antiseptic 11 as disclosed herein may comprise a topical antiseptic microbicide such as the commercial product sold under the trademark BETADINE by The Purdue Frederick Company of Norwalk, Conn. This solution comprises an antiseptic containing citric acid, dibasic sodium phosphate, glycerine and other inactive ingredients with the solution containing approximately 10% Povidone-Iodine as active ingredient.

Other medical solutions of BETADINE have been known to use ammonium monoxysal-4 sulfate, lauramide DES and water as inactive ingredients with 7.5% of Povidone-Iodine as an active ingredient.

The antiseptic polish 13 is formed by dispersing and mixing in ratios of approximately one gram of BETADINE antiseptic mocrobicide with approximately one fluid ounce of NU FINISH polish. The antiseptic reacts with the polish to form a new product 13 which remains in solution over a period of time and may be maintained in that form for a long shelf life or may be immediately applied to a surface to be protected for sanitation purposes.

This new product, when applied to an often used surface such as a door knob, toilet seat, shopping basket or cart handle will substantially prevent the passage of germs from the object to the user thereof.

In use the antiseptic polish 13 in solution form is shaken and then spread thinly on the surface to be protected, as shown in block 14 of the drawing, and is air dried as illustrated in block 15. In a few minutes after application of the polish to a given surface it becomes hard, essentially transparent and non-tacky. The polish 13 may be applied effectively to any hard type material such as iron, brass, aluminum wood, plastics, copper, glass, fibreglass and the like. One simple method of application is to apply a thin coating of it to the chosen surface with a sponge, cloth, cotton swab or the like, which polish is then rubbed to fuse the polish to the surface being covered. After drying for a few minutes the coating is rubbed with a dry cloth until it becomes a hard, substantially transparent, dry polish surface.

This coating, due to the antiseptic material mixed and/or integrated therein kills germs and repels bugs which come in contact with it.

The material and its antiseptic coating when applied to a given surface will have an indefinite life i.e., thirty days or more, depending on the amount of touching it receives although it may be washed periodically without any noticeable reduction in its antiseptic function.

It is believed desirable to reapply it to the given surface as shown in blocks 16 and 17 of the drawing every 24 hours for shopping baskets and cart handles to maintain its maximum antiseptic ability.

The substance is not believed harmful to humans.

Although but one embodiment of the invention has been illustrated and described, it will be apparent to those skilled in the art that various changes and modifications may be made therein without departing from the spirit of the invention or from the scope of the appended claims.

What is claimed is:

1. A composition of matter for coating an often touched surface by the hands of humans consisting essentially of:
    a first non-wax liquid polish;
    a second liquid topical antiseptic microbicide comprising ammonium nonoxynol-4 sulfate, lauramide DES and water as inactive ingredients with approximately 7.5 to 10% by volume of Povidone-Iodine as an active ingredient;
    said liquid topical antiseptic microbicide dispersed throughout said first liquid polish at a ratio of approximately one gram of microbicide per one fluid ounce of liquid polish.

2. A method of coating an often touched surface with an antiseptic polish to substantially prevent the passage of germs from the surface to the user thereof comprising the steps of:
    mixing a non-wax liquid polish of a first predetermined fluid content by volume with an antiseptic of a second predetermined liquid content by weight to from a liquid antiseptic polish,
    spreading a thin layer of said antiseptic polish on an often touched surface, and
    drying the surface,
    said antiseptic comprising approximately 7.5 to 10 percent by volume of Povidone-Iodine.

3. The method set forth in claim 2 in further combination with the step of:
    rubbing the covered surface with a cloth to obtain a surface with a high gloss non tacky surface.

4. The method set forth in claim 2 in further combination with the steps of:
    spreading a second thin layer of said antiseptic polish on said surface, and
    air drying said second layer of said polish.

* * * * *